(12) United States Patent
Ishino et al.

(10) Patent No.: US 9,675,192 B2
(45) Date of Patent: Jun. 13, 2017

(54) ORDERED FOOD AND DRINK CONVEYING APPARATUS AND FOOD AND DRINK CONVEYING APPARATUS

(71) Applicant: Ishino Seisakusho Co., Ltd., Ishikawa (JP)

(72) Inventors: Haruki Ishino, Kanazawa (JP); Kunihiko Motooka, Kanazawa (JP); Shigeru Kubo, Kanazawa (JP)

(73) Assignee: Ishino Seisakusho Co., Ltd., Ishikawa (JP)

( * ) Notice: Subject to any disclaimer, the term of this patent is extended or adjusted under 35 U.S.C. 154(b) by 0 days.

(21) Appl. No.: 14/902,015

(22) PCT Filed: Oct. 16, 2015

(86) PCT No.: PCT/JP2015/079275
§ 371 (c)(1),
(2) Date: Dec. 30, 2015

(87) PCT Pub. No.: WO2016/129147
PCT Pub. Date: Aug. 18, 2016

(65) Prior Publication Data
US 2017/0007055 A1    Jan. 12, 2017

(30) Foreign Application Priority Data

Feb. 13, 2015   (JP) .................................. 2015-026659
Feb. 13, 2015   (JP) .................................. 2015-026660
Aug. 25, 2015   (JP) .................................. 2015-165841

(51) Int. Cl.
*B65G 15/22*    (2006.01)
*A47G 23/08*    (2006.01)
*A47F 10/06*    (2006.01)

(52) U.S. Cl.
CPC .............. *A47G 23/08* (2013.01); *A47F 10/06* (2013.01)

(58) Field of Classification Search
CPC ........ B65G 15/22; B65G 13/08; B65G 15/24; B65G 15/30; B65G 17/005; B65G 35/08;
(Continued)

(56) References Cited

U.S. PATENT DOCUMENTS 5,876,515 A  *  3/1999  Varpio ................... A47L 15/247
                                                          134/25.1
6,675,950 B1    1/2004  Collon
(Continued)

FOREIGN PATENT DOCUMENTS

CN      203255624 U     10/2013
CN      203682374 U      7/2014
(Continued)

OTHER PUBLICATIONS

Office Action in AU Application No. 2015288888 dated Jul. 7, 2016, 5 pages.
(Continued)

*Primary Examiner* — Gene Crawford
*Assistant Examiner* — Lester Rushin
(74) *Attorney, Agent, or Firm* — Marshall, Gerstein & Borun LLP

(57) ABSTRACT

The ordered food and drink conveying apparatus includes: a main belt conveyor to form a conveying path leading to a customer seat from a kitchen side of a restaurant; an auxiliary belt conveyor to be provided in extension from the main belt conveyor on the kitchen side to elongate the conveying path; and a control unit to operate the auxiliary belt conveyor and the main belt conveyor upon a conveyance start operation being performed and to convey the dish of the food and drink placed on the auxiliary belt conveyor to the customer (Continued)

seat, the control unit setting the auxiliary belt conveyor in a stop state enabling placement of the dish to be conveyed next on the auxiliary belt conveyor before stopping the main belt conveyor upon the dish being transferred onto the main belt conveyor from the auxiliary belt conveyor by performing the conveyance start operation.

2 Claims, 15 Drawing Sheets

(58) Field of Classification Search
CPC ........ B65G 37/00; B65G 17/26; B65G 43/10; B65G 47/22; B65G 47/844; B65G 2203/02; B65G 2203/0208; B65G 2203/025; B65G 2812/02415; B65G 2812/02613; B65G 1/1371; B65G 47/71; B65G 25/00; B65G 2207/36; A47G 23/08
USPC ........................ 198/464.1–464.3, 465.2, 890
See application file for complete search history.

(56) References Cited

U.S. PATENT DOCUMENTS 8,191,704 B2    6/2012    Ishino et al.

2011/0198196 A1*   8/2011   Eckert .................. B65G 47/261
                                                    198/577

FOREIGN PATENT DOCUMENTS

| GB | 2 336 824 A | 11/1999 |
|----|-------------|---------|
| JP | 49-149480 | 12/1974 |
| JP | 2004-290522 | 10/2004 |
| JP | 2005-185326 | 7/2005 |
| JP | 2005-185327 | 7/2005 |
| JP | 2008-099885 | 5/2008 |
| JP | 2011-000289 | 1/2011 |
| JP | 2012-061090 | 3/2012 |
| JP | 2013-066607 | 4/2013 |
| TW | M490279 U | 11/2014 |

OTHER PUBLICATIONS

Search Report in International Application No. PCT/JP2015/079275 dated Jan. 19, 2016, 4 pages.

Office Action in TW Application No. 105100562 dated Feb. 15, 2017, 11 pages.

* cited by examiner

ORDERED FOOD AND DRINK CONVEYING APPARATUS AND FOOD AND DRINK CONVEYING APPARATUS

TECHNICAL FIELD

The present invention pertains to an ordered food and drink conveying apparatus and a food and drink conveying apparatus.

BACKGROUND ART

Over the recent years, restaurants have been providing food and drink by use of conveying apparatuses (refer to, e.g., Patent documents 1-3).

DOCUMENTS OF PRIOR ARTS

Patent Document

[Patent document 1] Japanese Patent Application Laid-Open Publication No. 2011-289
[Patent document 2] Japanese Patent Application Laid-Open Publication No. 2008-99885
[Patent document 3] Japanese Patent Application Laid-Open Publication No. 2005-185326

SUMMARY OF THE INVENTION

Problems to be Solved by the Invention

In the case of conveying ordered food and drink, for instance, it is considered to convey dishes served with the food and drink by placing the dishes on a belt conveyor leading to customer seats from a kitchen. One belt conveyor builds up a conveying path leading to the customer seats from the kitchen, in which case the next dish cannot be placed on the belt conveyor at the kitchen while carrying the dish on the belt conveyor to the customer seat. It is therefore difficult to efficiently provide the ordered food and drink. When the belt conveyor leading to the customer seats has a long route, a period of operating time of the belt conveyor elongates, and hence efficiency for providing the ordered food and drink remarkably decreases.

Under such circumstances, the present application discloses an ordered refreshment conveying apparatus capable of efficiently conveying ordered food and drink to customer seat from a kitchen.

Means For Solving The Problems

To solve the problems, the present invention has a configuration including a main belt conveyor forming a conveying path leading to customer seats from a kitchen of a restaurant, and additionally an auxiliary belt conveyor provided in extension from the main belt conveyor on the side of the kitchen and elongating the conveying path, in which when a dish is transferred onto the main belt conveyor from the auxiliary belt conveyor, the auxiliary belt conveyor is set in a stop state before stopping the main belt conveyor.

Specifically, an ordered food and drink conveying apparatus according to the present invention includes: a main belt conveyor to form a conveying path leading to a customer seat from a kitchen side of a restaurant; an auxiliary belt conveyor to be provided in extension from the main belt conveyor on the kitchen side to elongate the conveying path; and a control unit to operate the auxiliary belt conveyor and the main belt conveyor upon a conveyance start operation being performed and to convey the dish of the food and drink placed on the auxiliary belt conveyor to the customer seat, the control unit setting the auxiliary belt conveyor in a stop state enabling placement of the dish to be conveyed next on the auxiliary belt conveyor before stopping the main belt conveyor upon the dish being transferred onto the main belt conveyor from the auxiliary belt conveyor by performing the conveyance start operation.

The ordered food and drink conveying apparatus includes the main belt conveyor forming the conveying path leading to the customer seats from the kitchen of the restaurant, and additionally the auxiliary belt conveyor, in which when the dish is transferred onto the main belt conveyor from the auxiliary belt conveyor, the auxiliary belt conveyor is set in the stop state before stopping the main belt conveyor, and the dish to be conveyed next can be placed on the auxiliary belt conveyor even halfway of the dish being conveyed by the main belt conveyor. Accordingly, as in the case of forming the conveying path leading to the customer seats from the kitchen by one belt conveyor, the next dish can be placed on the belt conveyor at the kitchen, and hence the ordered food and drink can be conveyed efficiently to the customer seat from the kitchen.

The auxiliary belt conveyor may have a length enabling a plurality of dishes to be arranged along a longitudinal direction of the conveying path, and the control unit may set the auxiliary belt conveyor in the stop state enabling the placement of the dish to be conveyed next on the auxiliary belt conveyor before stopping the main belt conveyor upon all the plurality of dishes being transferred onto the main belt conveyor from the auxiliary belt conveyor by performing the conveyance start operation. With the ordered food and drink conveying apparatus being thus configured, a plurality of dishes can be conveyed batchwise, and the ordered food and drink can be conveyed further efficiently to the customer seats from the kitchen.

The auxiliary belt conveyor may be provided with a plurality of sensors to detect existence or non-existence of the dish along a longitudinal direction of the conveying path, and the control unit may operate the auxiliary belt conveyor to transfer the dish placed on the auxiliary belt conveyor onto the main belt conveyor when a sensor, located in a farthest position from the customer seat, of the plurality of sensors detects the dish but when a sensor, located in a closest position from the customer seat, of the plurality of sensors does not detect the dish. The ordered food and drink conveying apparatus thus configured facilitates an arrangement of the plurality of dishes on the auxiliary belt conveyor by a staff member.

The main belt conveyor may be provided with a branch lane branching off the conveying path of the main belt conveyor, and a route change unit for guide the dish to be conveyed by the main belt conveyor to the branch lane, and the control unit may stop the main belt conveyor when the dish conveyed by the conveyance start operation enters the branch lane. With the ordered food and drink conveying apparatus being thus configured, the dishes arriving at the customer seats flow to the branch lane from the main belt conveyor, and hence the food and drink can be conveyed more efficiently than the customers take the dishes on the conveyor.

The control unit may decrease the conveying speed of the main belt conveyor when the dish conveyed by the main belt conveyor approaches the route change unit. With the ordered food and drink conveying apparatus being thus configured, there is no possibility of the food and drink being inclined in posture as an advancing route of the dish changes.

The control unit may operate the main belt conveyor at a conveying speed higher than by the auxiliary belt conveyor upon the conveyance start operation being performed. As the conveying speed of the main belt conveyor increases, the ordered food and drink can be efficiently conveyed to the customer seats.

The ordered food and drink conveying apparatus may further include: an opening/closing blocking member to be disposed at the main belt conveyor on the side of the kitchen and to block the conveying path; and an optical sensor to detect the existence or non-existence of the dish of the food and drink placed on the main belt conveyor and to include a light receiving unit and a light emitting unit, any one of the light receiving unit and the light emitting unit being fixed to the blocking member, the other unit being fixed to the main belt conveyor on the side of the customer seat, in which the control unit may set the blocking member to open during a period of the dish of the food and drink being transferred onto the main belt conveyor from the auxiliary belt conveyor but may set the blocking member to close during a period of the dish of the food and drink placed on the main belt conveyor arriving at the customer seat.

With the ordered food and drink conveying apparatus being thus configured, one optical sensor can detect existence or non-existence of the dish placed on the main belt conveyor, and neither the light receiving unit nor the light emitting unit of the optical sensor becomes a hindrance against the route of the dish.

The control unit may set the blocking member in an open state and may operate the auxiliary belt conveyor and the main belt conveyor to convey the dish of the food and drink placed on the auxiliary belt conveyor to the customer seat when the conveyance start operation is performed and when the optical sensor detects non-existence of the dish of the food and drink on the main belt conveyor.

With the ordered food and drink conveying apparatus being thus configured, when the dishes of the food and drink placed on the main belt conveyor disappear, the conveyance of the dishes of the food and drink placed on the auxiliary belt conveyor is promptly started, resulting in increasing conveyance efficiency.

According to the present invention, rollers disposed on a portion of at least a curved route in the branch lane may be separated right and left with a central line of the route being interposed therebetween, and the right and left rollers may be rotatable independently of each other.

To be specific, a food and drink conveying apparatus according to the present invention includes: a conveying roller group to be disposed along a conveying path formed by a conveyor for conveyance of food and drink, leading to customer seats from a kitchen of a restaurant and to form a branch lane branching off the conveying path and having a falling gradient, in which rollers disposed on a portion of at least a curved route in the branch lane are separated right and left with a central line of the route being interposed therebetween, and the right and left rollers are rotatable independently of each other.

In the food and drink conveying apparatus, a rotation-directional angle of each of the rollers on the portion of the curved route changes stepwise in an inward direction of a corner as the dishes sequentially advance on the rollers as viewed from a viewpoint of the dish advancing on the respective rollers. The dish basically advances along the rotating direction of the roller contacting the dish, and hence, when the rotation-directional angle of the roller contacting the dish changes, the route of the dish follows this angular change. As a result, a course of the dish is corrected close to an inside of the corner to move close to the central line of the route of the branch lane without being directed to an outside of the corner. With the food and drink conveying apparatus being thus configured, the dishes of the food and drink therefore smoothly move along a curved portion even when the branch lane using the roller conveyor has the curved portion.

The roller group may branch sideways of the conveying path from the conveying path, and may form the branch lane having the falling gradient along the conveying path. With the food and drink conveying apparatus being thus configured, the dish entering the branch lane descends along the branch lane having a falling gradient by its tare weight, and consequently the dishes can consecutively enter the branch lane from the conveyor.

The food and drink conveying apparatus may further include a route change unit to make a route change member retractable above the conveying path, the route change member protruding from sideways above the conveying path and being formed with an oblique guide unit to guide stepwise a dish of food and drink conveyed by the conveyor toward the branch lane, in which the roller group may form the branch lane branching obliquely sideways of the conveying path from the conveying path to follow a route of the dish guided by the guide unit of the route change member in a state of protruding above the conveying path. With the food and drink conveying apparatus being thus configured, the dishes conveyed by the conveyor enter the branch lane obliquely sideways of an advancing direction of the conveying path of the conveyor, and can smoothly enter the branch lane even by operating the conveyor at a substantially high conveying speed.

Effects of the Invention

The ordered food and drink conveying apparatus can efficiently convey the ordered food and drink to the customer seats from the kitchen.

MODE FOR CARRYING OUT THE INVENTION

An embodiment of the invention of the present application will hereinafter be described. The embodiment to be illustrated below is one aspect of the invention of the present application but does not limit in any way the technical scope of the invention of the present application. The embodiment and a modified example, which will hereinafter be illustrated, are suited to restaurants for serving a variety of food and drink instanced by sushi, beverages, bowls of buckwheat noodles and wheat flour noodles, deep-fried foods and deep-fired fishes and vegetables.

Figure 1:
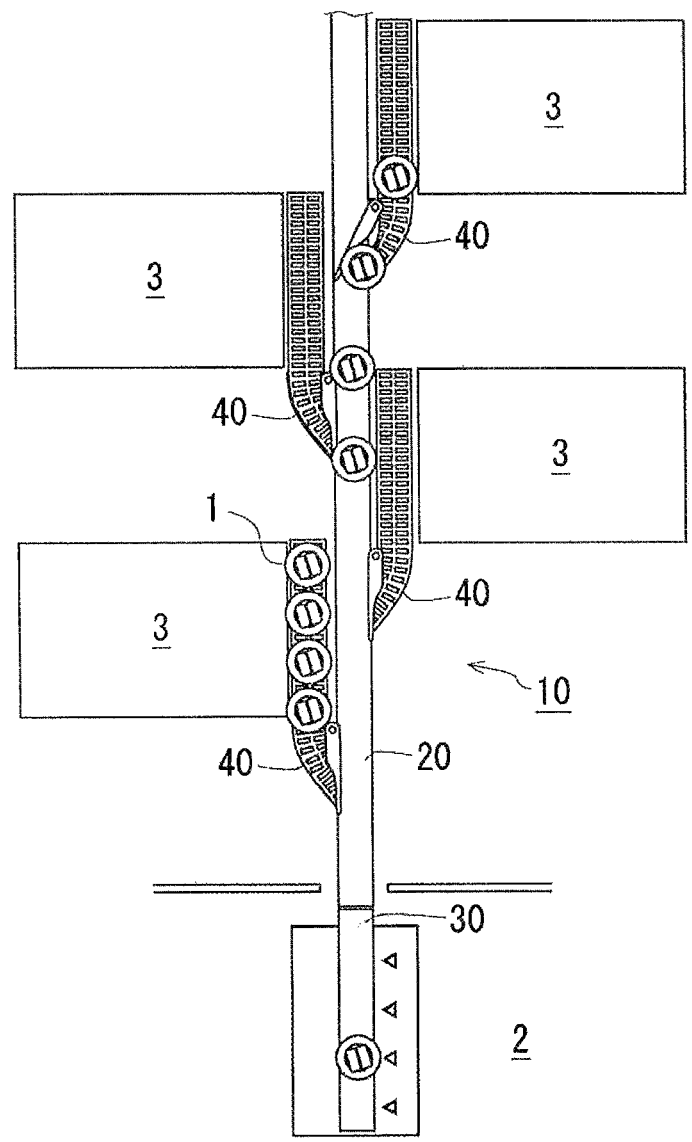
FIG. 1 is a view of a whole configuration of an ordered food and drink conveying apparatus according to an embodiment.

FIG. 1 is a view of a whole configuration of an ordered food and drink conveying apparatus according to the embodiment. An ordered food and drink conveying apparatus 10 is an apparatus configured to convey dishes 1 of food and drinks prepared upon receiving ordered from customers to customer seats 3 from a kitchen 2 of the restaurant, and forms, as illustrated in FIG. 1, a conveying path passing aside of the customer seats 3 on which the customers sit to eat and drink. The ordered food and drink conveying apparatus 10 includes a main belt conveyor 20 forming the conveying path leading to the customer seats 3 from the side of the kitchen 2 of the restaurant, and an auxiliary belt conveyor 30 provided in extension from the main belt conveyor 20 on the side of the kitchen 2 to elongate the conveying path. Note that the main belt conveyor 20 is rectilinearly shaped in the present embodiment, and, however, a plurality of main belt conveyors 20 may also be combined to form the conveying path including corner areas.

Figure 2:
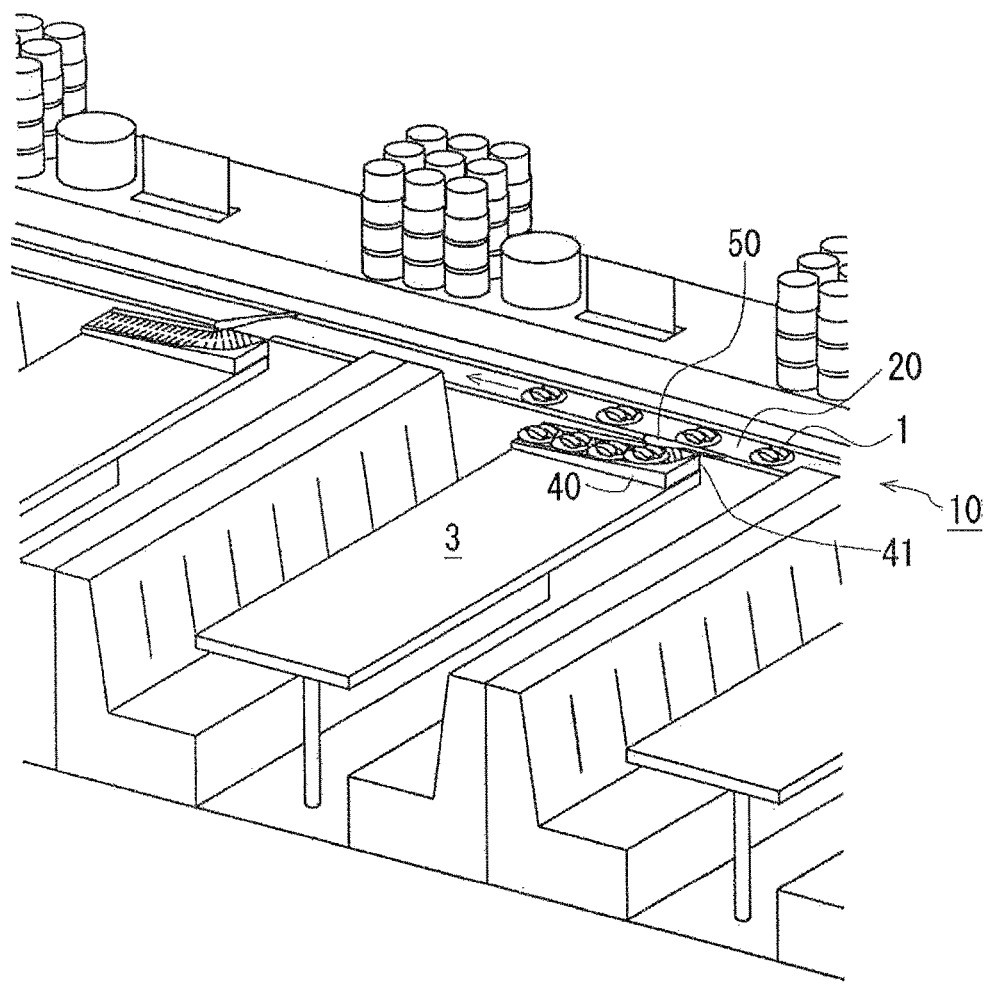
FIG. 2 is an enlarged view of a segment area in the vicinity of a customer seat of the ordered food and drink conveying apparatus.

FIG. 2 is an enlarged view of a segment area in the vicinity of the customer seat 3 of the ordered food and drink conveying apparatus 10. A branch lane 40 branching off the conveying path to form a path having a falling gradient is provided aside of the conveying path formed by the main belt conveyor 20. The ordered food and drink conveying apparatus 10 receives orders via order terminals and other equivalent devices installed at tables, and conveys the food and drink prepared at the kitchen 2.

The branch lane 40 is a lane onto which a route change device 50 transfers the dishes 1 of the food and drinks branched off the conveying path of the main belt conveyor 20, and is disposed along the conveying path formed by the main belt conveyor 20. The branch lane 40 is configured to include a rotatable roller group 41 for the conveyance. The branch lane 40 branches sideway from the conveying path of the main belt conveyor 20, and further forms the path having the falling gradient along the conveying path of the main belt conveyor 20, and hence the rollers roll upon receiving the transferred dishes 1 with the result that the dishes 1 move close to a terminal of the branch lane 40.

Note that a shelf board on which to place teacups, seasonings, menus and other equivalent prepared items is supported by supporting columns on an upper side of the ordered food and drink conveying apparatus 10, but nevertheless those supporting columns and the shelf board may be omitted, or other components may also be installed in place of the supporting columns and the shelf board. The branch lane 40, though provided on the table for box seats each having a rectangular top surface in FIG. 2, is not limited to a mode of being provided on the table for the box seats described above. The branch lane 40 may also be provided on, e.g., a table for counter seats.

Figure 3:
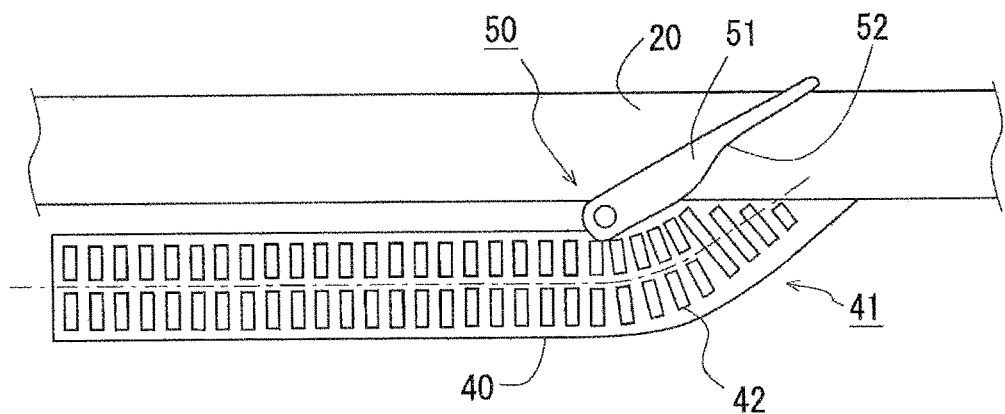
FIG. 3 is an enlarged view of a branch lane.

FIG. 3 is an enlarged view of the branch lane 40. The roller group 41 to build up the branch lane 40 builds up the branch lane branching off sideway from the conveying path formed by the main belt conveyor 20 along the route of the dishes 1 guided by a guide unit 52 of the route change device 50 in a state of protruding above the conveying path formed by the main belt conveyor 20. The rollers, disposed on a portion of at least the curved route, of the roller group 41 configuring the branch lane 40 are separated right and left with a central line, interposed therebetween, of the route formed by the branch lane 40, and the right and left rollers are rotatable independently of each other.

The route change device 50 is provided at a branch portion branching to the branch lane 40 from the conveying path formed by the main belt conveyor 20. The route change device 50 includes a route change member 51. The route change member 51 is a member protruding from sideway above the conveying path formed by the main belt conveyor 20, and is provided with the oblique guide unit 52 that guides the dishes 1 of the food and drinks, conveyed by the main belt conveyor 20, on a step-by-step basis toward the branch lane 40. The route change device 50 is an apparatus configured to make the route change member 51 retractable above the conveying path of the main belt conveyor 20. The route change device 50 moves the route change member 51 by an unillustrated built-in rotary solenoid. Note that the route change device 50 is not limited to the configuration including the rotary solenoid serving as a drive source but can be applied to configurations including an electric motor and a variety of other drive sources.

Figure 4:
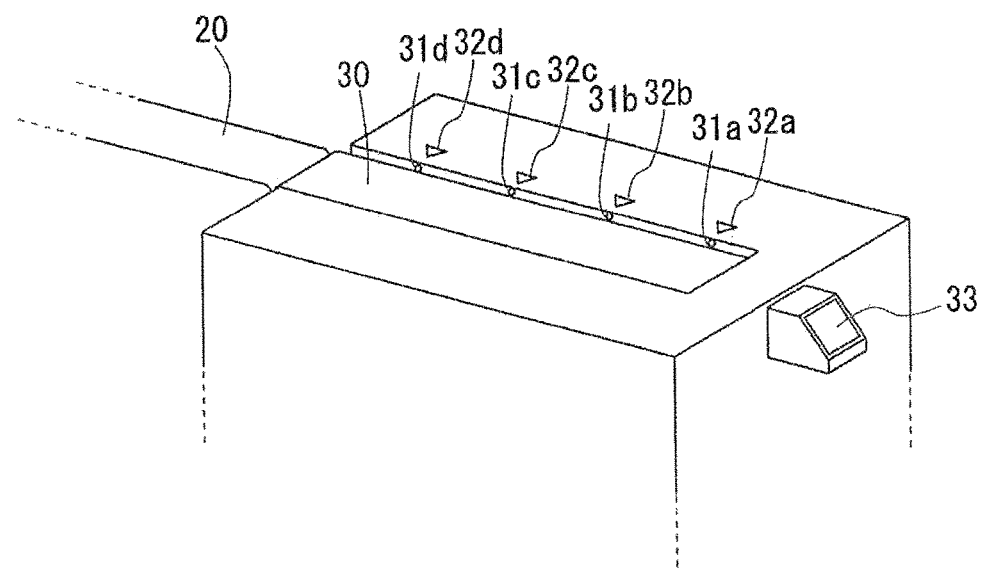
FIG. 4 is an enlarged view of a portion in the vicinity of an auxiliary belt conveyor.

FIG. 4 is an enlarged view of a position in the vicinity of the auxiliary belt conveyor 30. The auxiliary belt conveyor 30 disposed extending from the main belt conveyor 20 on the side of the kitchen 2 to elongate the conveying path of the main belt conveyor 20, has a length enabling a side-by-side arrangement of four dishes 1 along the longitudinal direction of the conveying path of the auxiliary belt conveyor 30. Optical sensors 31a, 31b, 31c, 31d to detect existences or non-existences of the dishes 1 are provided in positions along the longitudinal direction of the conveying path formed by the auxiliary belt conveyor 30. Position marks 32a, 32b, 32c, 32d indicating positions in which to place the dishes 1 on the auxiliary belt conveyor 30 are put on aside of the auxiliary belt conveyor 30, corresponding to the positions of the sensors 31a, 31b, 31c, 31d. An operation panel 33 to accept a variety of operations is provided in the vicinity of the auxiliary belt conveyor 30.

An unillustrated controller controls the drive motors to drive the main belt conveyor 20 and the auxiliary belt conveyor 30 and the rotary solenoid of the route change device 50 on the basis of contents of the operations inputted onto the operation panel 33 and signals given from the sensors. An operation of the ordered food and drink conveying apparatus 10 attained through the controller will hereinafter be described.

<Operation at Non-Conveyance Time>

The controller for the ordered food and drink conveying apparatus 10, when the sensor 31 (corresponding to a "predetermined sensor" termed in the present application), located farthest from the customer seats 3, in the plurality of sensors 31a, 31b, 31c, 31d detects the dish 1, operates the auxiliary belt conveyor 30 to move the dish 1 detected by the sensor 31a to a position of the sensor 31b neighboring to the sensor 31a.

Figure 5:
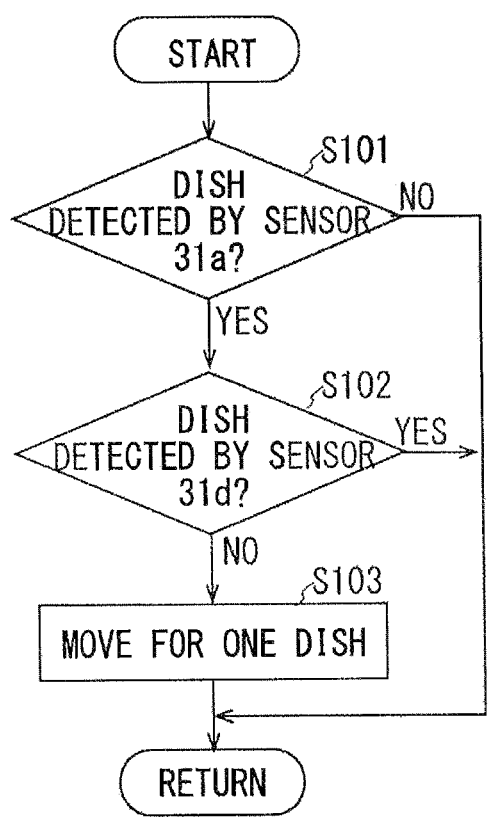
FIG. 5 is a control flow chart pertaining to the auxiliary belt conveyor.

FIG. 5 illustrates a control flowchart pertaining to the auxiliary belt conveyor 30. The controller for the ordered food and drink conveying apparatus 10 determines whether the sensor 31a detects the dish 1 or not (S101). The controller, when determining that the sensor 31a detects the dish 1 in the process of step S101, further determines whether the sensor 31d detects the dish 1 (S102). The controller, when determining that the sensor 31d does not detect the dish 1 in the process of step S102, operates the auxiliary belt conveyor 30 to move the dish 1 at a distance corresponding to only one dish (S103). The controller, when determining that the sensor 31a does not detect the dish 1 in the process of step S101 or that the sensor 31d detects the dish 1 in the process of step S102, repeats the processes from step S101 onward while omitting the process in step S103.

Figure 6A:
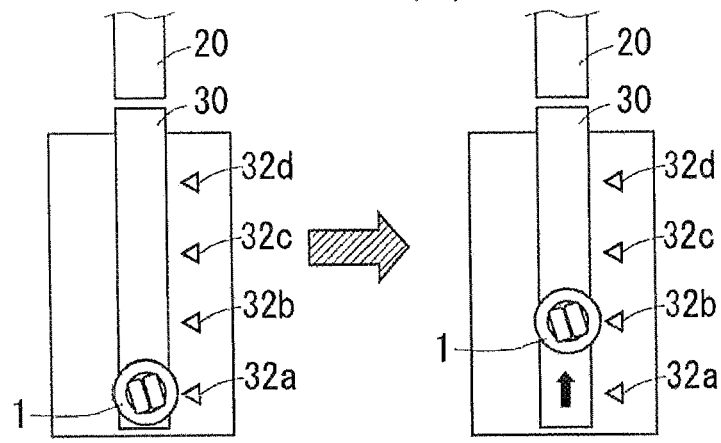
FIGS. 6(A)-6(C) are views illustrating an operational example of the auxiliary belt conveyor at non-conveyance time.
Figure 6B:
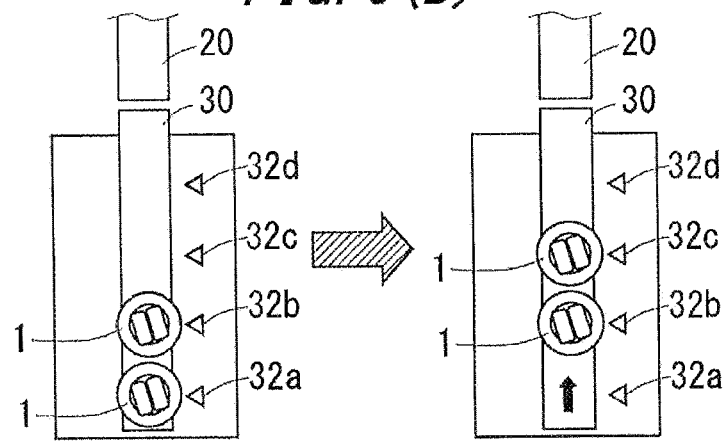
Figure 6C:
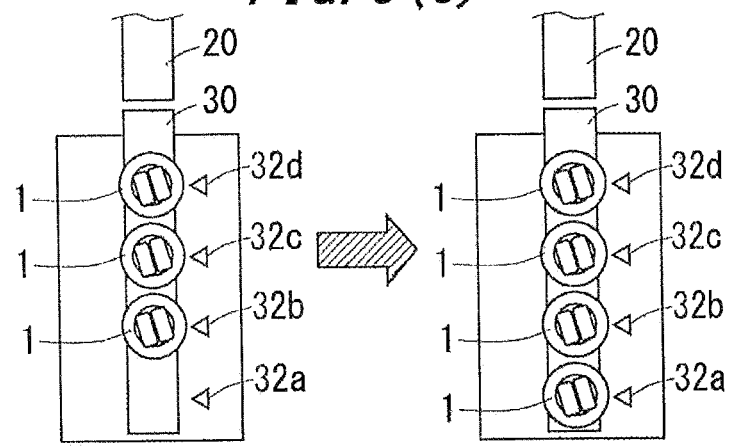

FIGS. 6(A)-6(C) are views illustrating an operational example of the auxiliary belt conveyor 30 at non-conveyance time. For example, as depicted in FIG. 6(A), in a state of even one dish 1 not being placed on the auxiliary belt conveyor 30, when a staff member at the kitchen 2 places the dish 1 on a portion, vicinal to the position mark 32a, of the auxiliary belt conveyor 30, the controller for the ordered food and drink conveying apparatus 10 operates the auxiliary belt conveyor 30 to move the dish 1 placed on the portion vicinal to the position mark 32a to a portion vicinal to the position mark 32b. When another dish 1 is placed on the portion vicinal to the position mark 32a in this state, the controller for the ordered food and drink conveying apparatus 10, as depicted in FIG. 6(B), moves the dish 1 placed on the portion vicinal to the position mark 32a to the portion vicinal to the position mark 32b, and hence there is reached a state in which the two dishes 1, 1 are placed respectively on the portions, vicinal to the position marks 32b 32c, of the auxiliary belt conveyor 30. Note that the controller for the ordered food and drink conveying apparatus 10, as illustrated in FIG. 6(C), in a state of three dishes 1, 1, 1 being placed respectively on portions vicinal to the position marks 32b, 32c, 32d, does not operate the auxiliary belt conveyor 30 even when another dish 1 is placed on the portion vicinal to the position mark 32a.

The auxiliary belt conveyor 30 thus operates, thereby enabling the plurality of dishes 1 to be arranged on the auxiliary belt conveyor 30 simply by placing the dish 1 on the portion vicinal to the position mark 32a close to the staff member's side at the kitchen 2 to facilitate the placement of the dish 1.

<Operation at Conveyance Time>

The controller for the ordered food and drink conveying apparatus 10, upon a conveyance start operation being performed on the operation panel 33, operates the auxiliary belt conveyor 30 and the main belt conveyor 20 to convey the dish 1 of the food and drink placed on the auxiliary belt conveyor 30 to the customer seat 3.

Figure 7:
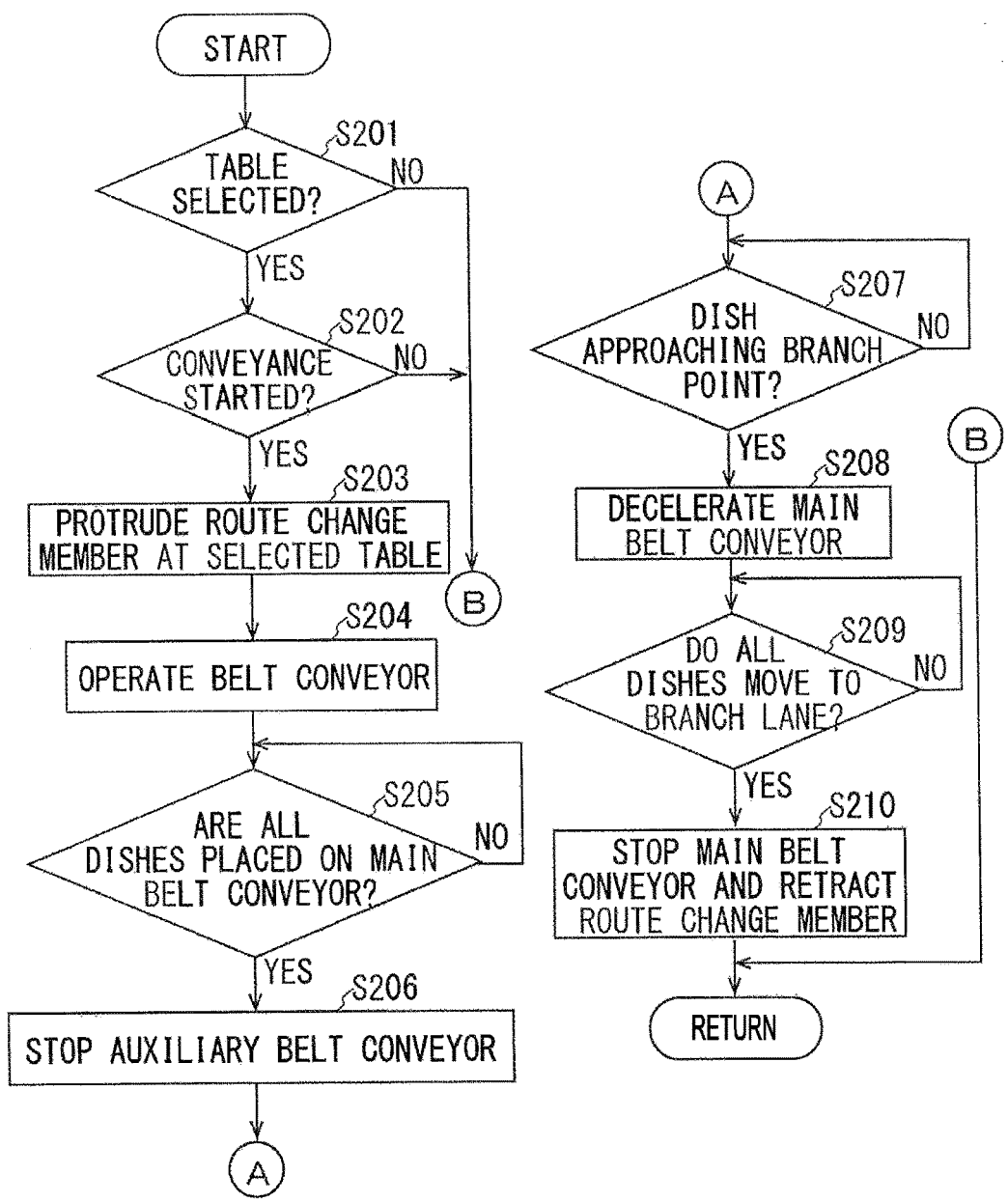
FIG. 7 is a control flowchart of processes to be executed upon a conveyance start operation being performed.

FIG. 7 illustrates a control flowchart of processes to be executed upon the conveyance start operation being performed. The controller for the ordered food and drink conveying apparatus 10 determines whether a table selecting operation is conducted on the operation panel 33 (S201). The controller, when detecting that the table selecting operation is conducted in the process of step S201, determines next whether the conveyance start operation is performed (S202). The controller, when detecting that the conveyance start operation is performed in the process of step S202, operates the route change device 50 provided at the branch point to the branch lane 40 installed at the selected table to protrude the route change member 51 above the main belt conveyor 20 (S203). Then, the controller operates the main belt conveyor 20 and the auxiliary belt conveyor 30 (S204). Note that the controller operates the main belt conveyor 20 at a higher conveying speed than a speed of the auxiliary belt conveyor 30.

The controller, after executing the process in step S204, determines whether all the dishes 1 placed on the auxiliary belt conveyor 30 are transferred to the main belt conveyor 20 (S205). The controller may determine, based on a detection result of the sensor installed in the vicinity of a boundary between the auxiliary belt conveyor 30 and the main belt conveyor 20, whether all the dishes 1 placed on the auxiliary belt conveyor 30 are transferred to the main belt conveyor 20, and may also determine based on a period of elapse time since starting the auxiliary belt conveyor 30. The controller, when making an affirmative determination in the process of step S205, stops the auxiliary belt conveyor 30 (S206).

The controller, after executing the process in step S206, determines whether the dish 1 approaches the branch point to the branch lane 40 at the selected table (S207). The controller may determine, based on, e.g., the detection result of the sensor installed in the vicinity of the branch point, whether the dish 1 approaches the branch point, and may also determine based on a period of elapse time since starting the conveyance, the elapse time being preset per position of the branch point. The controller, when making the affirmative determination in the process of step S207, decelerates the main belt conveyor 20 (S208).

The controller, after executing the process in step S208, determines whether all the dishes 1 placed on the main belt conveyor 20 move to the branch lane 40 (S209). The controller may determine based on, e.g., the detection result of the sensor installed in the vicinity of the branch point, whether all the dishes 1 placed on the main belt conveyor 20 move to the branch lane 40, and may also determine based on the period of elapse time since starting the conveyance, the elapse time being preset per position of the branch point. The controller, when making the affirmative determination in the process of step S209, stops the main belt conveyor 20 to retract the route change member 51 of the route change device 50 from above the main belt conveyor 20 (S210).

Note that the controller, when making a negative determination in any one of step S201 and step S202, executes again the processes from step S201 onward but with an omission of the processes from step S203 onward.

FIGS. 8(A)-8(D) are views illustrating motions of the dishes 1 and the route change member 51 when conveyed.

Figure 8A:
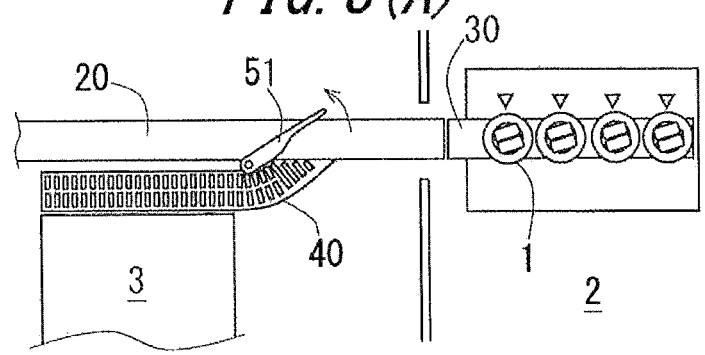
FIGS. 8(A)-8(D) are views illustrating motions of dishes and a route change member when conveyed.
Figure 8B:
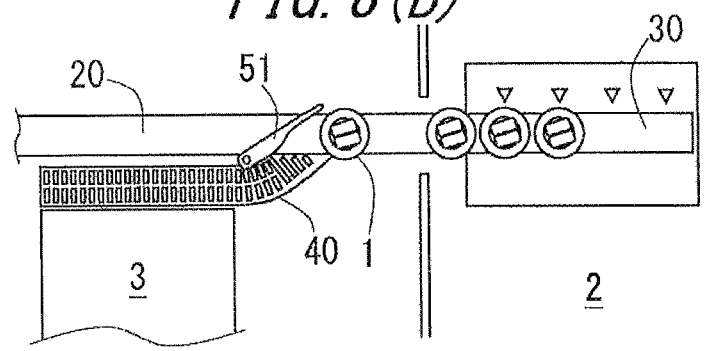
Figure 8C:
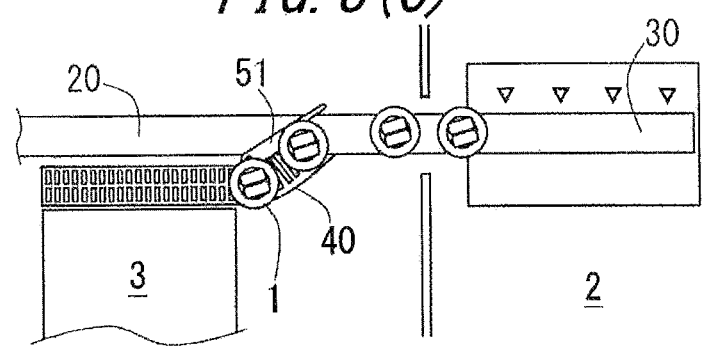
Figure 8D:
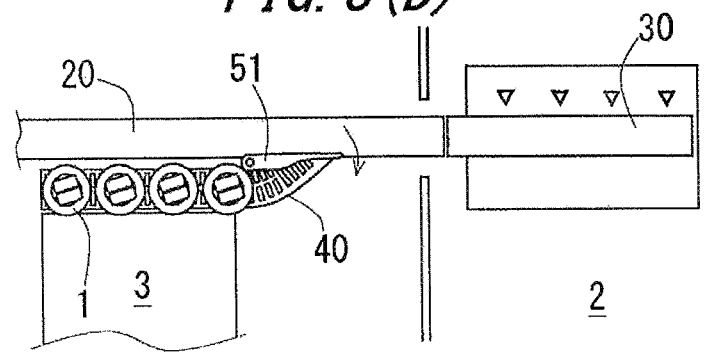

Upon a conveyance start request being made, as illustrated in FIG. 8(A), the route change member 51 vicinal to the selected table protrudes above the main belt conveyor 20, and the main belt conveyor 20 and the auxiliary belt conveyor 30 operate. Thereupon, as depicted in FIG. 8(B), the dishes 1 placed on the auxiliary belt conveyor 30 are sequentially fed onto the main belt conveyor 20. The dishes 1 fed onto the main belt conveyor 20, as illustrated in FIG. 8(C), eventually contact the route change member 51 and are guided to the branch lane 40. All the dishes 1 placed on the auxiliary belt conveyor 30 are transferred onto the main belt conveyor 20, at which time the auxiliary belt conveyor 30 comes to a stop state. The dishes 1 entering the branch lane 40 move on the branch lane 40 and, as illustrated in FIG. 8(D), sequentially arrive at the terminal of the branch lane 40. The route change member 51 retracts from above the main belt conveyor 20.

The contents of the main operations attained by the controller for the ordered food and drink conveying apparatus 10 are as described above. The ordered food and drink conveying apparatus 10, when all the dishes 1 placed on the auxiliary belt conveyor 30 are transferred onto the main belt conveyor 20, enables the staff member at the kitchen 2 to immediately place the next dish 1 on the auxiliary belt conveyor 30 even during the operation of the main belt conveyor 20 because of the auxiliary belt conveyor 30 being stopped. Accordingly, even when receiving a large quantity of orders for the food and drink, the ordered food and drink can be efficiently conveyed to the customer seats. Such an effect of the ordered food and drink conveying apparatus 10 is conspicuous particularly at the restaurant having a long conveying path formed by the main belt conveyor 20. The ordered food and drink conveying apparatus 10 according to the embodiment enables a substantial increase in conveying speed of the main belt conveyor 20 and an efficiency conveyance of the dishes 1 served with the food and drinks because of the dishes 1 being conveyed to the branch lane 40 branching off obliquely to an advancing direction of the conveying path formed by the main belt conveyor 20. The ordered food and drink conveying apparatus 10 according to the embodiment has a low possibility of the food and drink on the dish 1 being inclined in position due to an impact when the dish 1 contacts the route change member 51 because the conveying speed of the main belt conveyor 20 decreases as the dish 1 approaches the branch lane 40.

By the way, the rollers 42, disposed on the portion of at least the curved route, of the roller group 41 configuring the branch lane 40 are, as already described, separated right and left with the central line, interposed therebetween, of the route formed by the branch lane 40, and the right and left rollers are rotatable independently of each other. Hence, the controller for the ordered food and drink conveying apparatus 10 attains the motions described above, the operation being such that the dish 1 placed on the main belt conveyor 20, when contacting the route change member 51 and being guide to the branch lane 40, moves as follows on the branch lane 40.

Figure 9A:
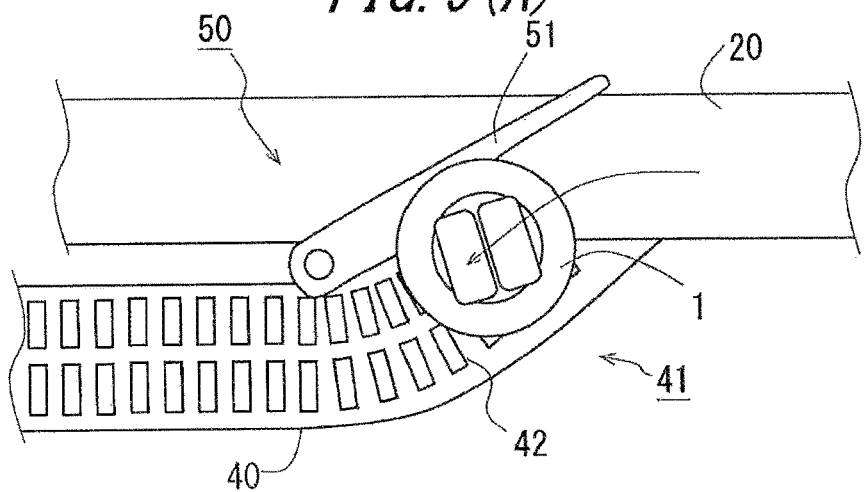
FIGS. 9(A)-9(C) are first views illustrating the motion of the dish entering the branch lane.
Figure 9B:
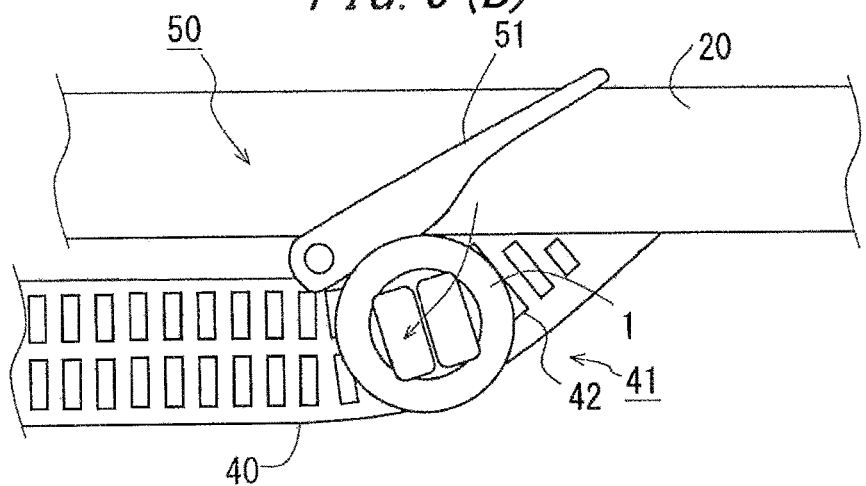
Figure 9C:
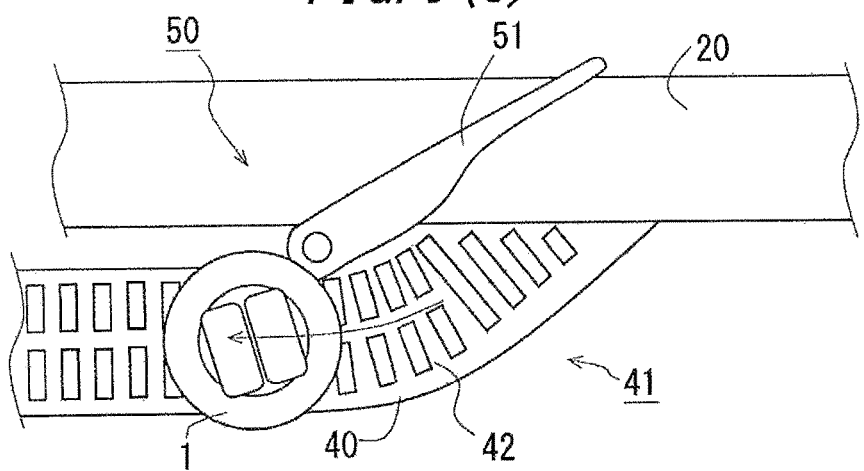

FIGS. 9(A)-9(C) are first views each illustrating the motion of the dish 1 entering the branch lane 40. The dish 1 placed on the main belt conveyor 20, when a thread cutter portion of the dish 1 contacts the guide unit 52 of the route change member 51, as depicted in FIG. 9(A), is put on the rollers of the roller group 41 building up the branch lane 40. The rollers of the roller group 41 are rotatable independently of each other. Hence, the dish 1 placed on the branch lane 40 having the falling gradient starts descending along the branch lane 40 while rolling on the rollers of the roller group 41 by its tare weight. As illustrated in FIG. 9(B), the dish 1 enters the portion of the curved route on the branch lane 40. For a reason elucidated below, as illustrated in FIG. 9(C), the dish 1 gradually descends along a slope while correcting a course so as to be located on the central line of the conveying path of the branch lane 40.

The rollers 42 on the portion of the curved route of the branch lane 40 are separated right and left with the central line, interposed therebetween, of the route formed by the branch lane 40, and the right and left rollers are rotatable independently of each other. A rotating axis of each roller 42 is at a right angle to the central line of the route formed by the branch lane 40. Hence, as viewed from a viewpoint of the dish 1, with the dish 1 advancing in sequence on the rollers 42, an angle of the roller 42 contacting the dish 1 in the rotating direction varies on the step-by-step basis in an inward direction of the corner. The dish 1 basically advances along the rotating direction of the roller 42 contacting the dish 1, and hence, when an angle of the rotating direction of the roller 42 contacting the dish 1 changes, the route of the dish 1 follows this angular change. As a result, the course of the dish 1 is corrected close to an inside of the corner to move close to the central line of the route of the branch lane 40 without being directed to an outside of the corner. Note that in FIG. 9 and other drawings illustrate the roller group 41 of the branch lane 40, the rollers of which are separated right and left with the central line of the route being interposed therebetween with respect to the rectilinear portion of the branch lane 40, and, however, the rollers on the rectilinear portion have no necessity of being configured right and left to be rotatable independently of each other. It may be sufficient that only the rollers 42 on the portion of the curved route of the branch lane 40 are configured right and left to be rotatable independently of each other, while the rollers on the rectilinear portion may not be separated right and left.

The dish 1 is located closer to the inside of the corner than the central line of the route of the branch lane 40, in which case the course of the dish 1 is corrected close to the outside of the corner to move close to the central line of the route of the branch lane 40. A reason for this is given such that each roller 42 is a cylindrical roller having an outer peripheral surface not being tapered and an outside diameter being fixed. In other words, each roller 42 is the cylindrical roller having the outer peripheral surface not being tapered and the outside diameter being fixed, and hence a force required for rotating the roller 42 itself is the same as the force of the rollers inside and outside the corner. The corner portion close to the inside has the course being drawn sharper than the portion close to the outside. Hence, as viewed from the viewpoint of the dish 1, the course close to the inside is sharper in change of the angle of the roller 42 contacting the dish 1 than the course close to the outside. Accordingly, the inner roller 42 having a larger angle in the rotating direction with respect to the advancing direction of the dish 1 than the angle of the outer roller 42, generates a frictional force against the dish 1 at the contact portion with the dish 1, thereby hindering the dish from smoothly advancing. As a result, the dish 1 becomes close to the easy-to-advance outer roller 42. And the course thereof is corrected close to the outside of the corner to eventually move close to the central line of the route of the branch lane 40.

The branch lane 40 is configured so that the rollers embracing at least the corner portion are separated right and left with the central line, interposed therebetween, of the route of the branch lane 40, and the right and left rollers are rotatable independently of each other, whereby the course of the dish 1 is autonomously corrected to move close to the central line of the route of the branch lane 40. Consequently, the dish 1 descends along the slope of the branch lane 40 without causing any uncomfortable noises when the dish 1 contacts the member surrounding both side of the route of the branch lane 40.

Note that the branch lane 40 has gaps between the rollers, and therefore fragments and other equivalent substances of the food and drinks drop down and are easily accumulated on the underside of the branch lane 40. The restaurant needs taking sanitation into consideration, and it is therefore preferable that the rollers are easily detachable to facilitate cleaning the underside of the branch lane 40. For example, the rollers building up the branch lane 40 are fitted to one or a plurality of frame bodies detachably attached to a housing of the branch lane 40, thereby enabling the easy cleaning of the underside of the branch lane 40 simply by removing the frame body from the housing.

Figure 10A:
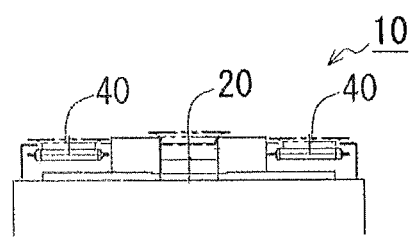
FIGS. 10(A)-10(E) is a first views illustrating a variation of a conveyance system using the ordered food and drink conveying apparatus described above, these first views being sectional views depicting the variation as taken along a line orthogonal to a conveying direction defined by the conveying path of the main belt conveyor.
Figure 10B:
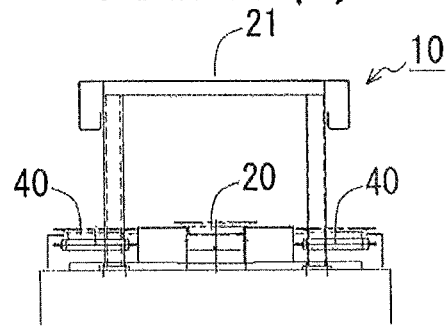
Figure 10C:
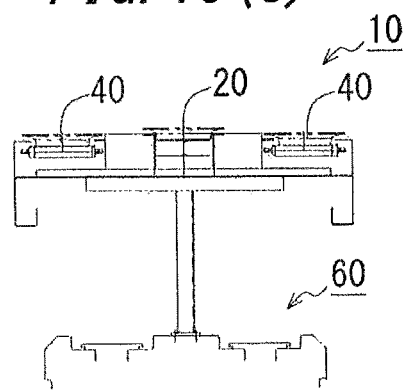
Figure 10D:
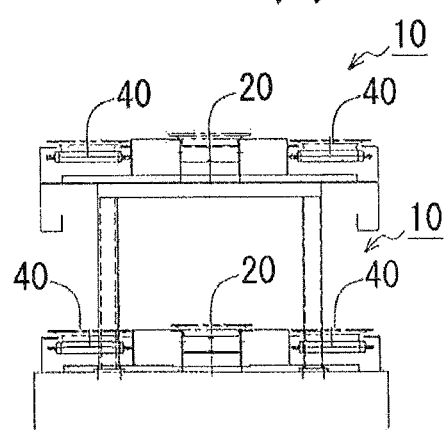
Figure 10E:
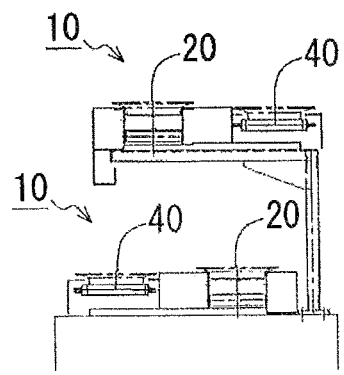

FIGS. 10(A)-10(E) are first views illustrating a variation of a conveyance system using the ordered food and drink conveying apparatus 10 described above, these first views being sectional views depicting the variation as taken along a line orthogonal to the conveying direction defined by the conveying path of the main belt conveyor 20. The conveyance system using the ordered food and drink conveying apparatus 10 is installed at the restaurant, in which case, as illustrated in FIG. 10(A), the conveyance system may be configured by the single ordered food and drink conveying apparatus 10. The ordered food and drink conveying apparatus 10 may also be configured so that a duct 21 covers, as depicted in FIG. 10(B), the area of the conveying path formed by the main belt conveyor 20. The ordered food and drink conveying apparatus 10 may also be configured so that the main belt conveyor 20 and the branch lane 40 are, as illustrated in FIG. 10(C), installed on a rack covering an upper side of a food and drink circulation conveying apparatus 60 built up by connecting crescent chains. The ordered food and drink conveying apparatuses 10 may further be, as illustrated in FIG. 10(D), arranged at upper and lower stages, respectively. The ordered food and drink conveying apparatuses 10 may still further be configured so that, as depicted in FIG. 10(E), one ordered food and drink conveying apparatus 10 takes charge of conveying the food and drink to the tables on one side in the advancing direction of the conveying path of the main belt conveyor 20, which the other ordered food and drink conveying apparatus 10 takes charge of conveying the food and drink to the tables on the opposite side.

Figure 11:
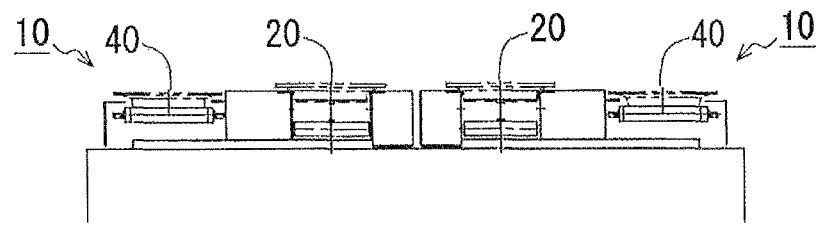
FIGS. 11(A)-11(C) are second views illustrating a variation of the conveyance system using the ordered food and drink conveying apparatus described above, these second views being sectional views depicting the variation as taken along the line orthogonal to the conveying direction defined by the conveying path of the main belt conveyor.
Figure 11:
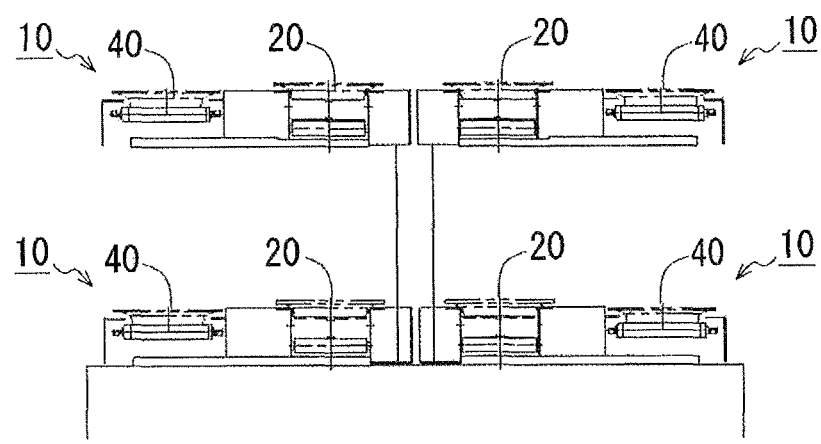
Figure 11:
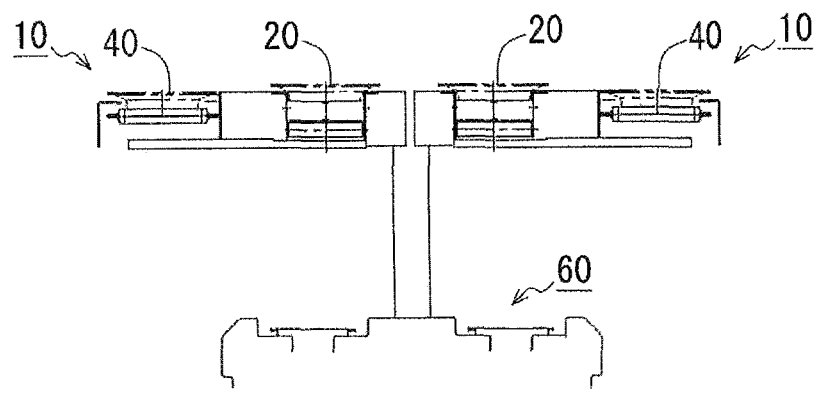

FIG. 11(A)-11(C) are second views illustrating a variation of the conveyance system using the ordered food and drink conveying apparatus 10 described above, these second views being sectional views depicting the variation as taken along the line orthogonal to the conveying direction defined by the conveying path of the main belt conveyor 20. The conveyance system using the ordered food and drink conveying apparatus 10 is installed at the restaurant, in which case, as illustrated in FIG. 11(A), the two ordered food and drink conveying apparatuses 10 may be arranged in parallel. As illustrated in FIG. 11(B), the two ordered food and drink conveying apparatuses 10 arranged in parallel may be provided at the upper and lower stages. Further, the two ordered food and drink conveying apparatuses 10 arranged in parallel may also be, as illustrated in FIG. 11(C), installed on the rack covering the upper side of the food and drink circulation conveying apparatus 60 built up by connecting the crescent chains.

Note that the branch lane 40 is included in the ordered food and drink conveying apparatus 10 according to the embodiment but may also be omitted. With the branch lane 40 being omitted, the controller for the ordered food and drink conveying apparatus 10 stops the main belt conveyor 20 when the dish 1 on the main belt conveyor 20 arrives at the predetermined table. When detecting that the dish 1 on the main belt conveyor 20 is removed, the controller starts conveying the next dish 1 on the auxiliary belt conveyor 30. Even in the ordered food and drink conveying apparatus 10 with the branch lane 40 being omitted, when all the dishes 1 on the auxiliary belt conveyor 30 are transferred onto the main belt conveyor 20, the auxiliary belt conveyor 30 comes to a stop state, and hence the next dish 1 can be placed on the auxiliary belt conveyor 30 even during the operation of the main belt conveyor 20.

The branch lane 40 included in the ordered food and drink conveying apparatus 10 according to the embodiment is not confined to being applied to the portion branching off the conveying path formed by the belt conveyor. The branch lane 40 may also be applied to the portion branching off the circulation route of the food and drink circulation conveying apparatus 60 built up by, e.g., the crescent chains.

In the ordered food and drink conveying apparatus 10 according to the embodiment, the auxiliary belt conveyor 30 is provided in one-to-one correspondence to the main belt conveyor 20, and, however, a plurality of auxiliary belt conveyors 30 may also be provided for the main belt conveyor 20. In this case, the plurality of auxiliary belt conveyors 30 may be arrayed in series for form the rectilinear conveying path together with the main belt conveyor 20, and the auxiliary belt conveyors 30 may also be provided in extension to radially branch off the end portion of the main belt conveyor 20 on the side of the kitchen.

A configuration of having, e.g., built-in drive devices instanced by the belt conveyor is considered by way of the branch lane to branch the dish served with the food and drink conveyed by the conveyor off the route of the conveyor. However, when desiring to accelerate the conveying speed of the conveyor, the branch lane is required to receive smoothly the dish of the food and drink, and it is therefore simple in configuration and rational to apply a roller conveyor moving to follow the motion of the dish to the branch lane 40. However, for instance, when desiring to provide the branch lane with the curved portion, the conventional roller conveyor hinders the dish from smoothly moving along the curved portion of the branch lane. In this point, the branch lane 40 is configured so that the rollers embracing at least the corner portion are separated right and left with the central line, interposed therebetween, of the route of the branch lane 40, and the right and left rollers are rotatable independently of each other, whereby the course of the dish 1 is autonomously corrected to move close to the central line of the course of the branch lane 40. Hence, even when the branch lane using the roller conveyor has the curved portion, the dish of the food and drink smoothly moves along the curved portion.

An ordered food and drink conveying apparatus according to a modified example with the branch lane 40 being omitted from the ordered food and drink conveying apparatus 10, will hereinafter be described. Note that the same components as those of the embodiment described above are marked with the same numerals and symbols in the following discussion, and their detailed explanations are omitted.

Figure 12:
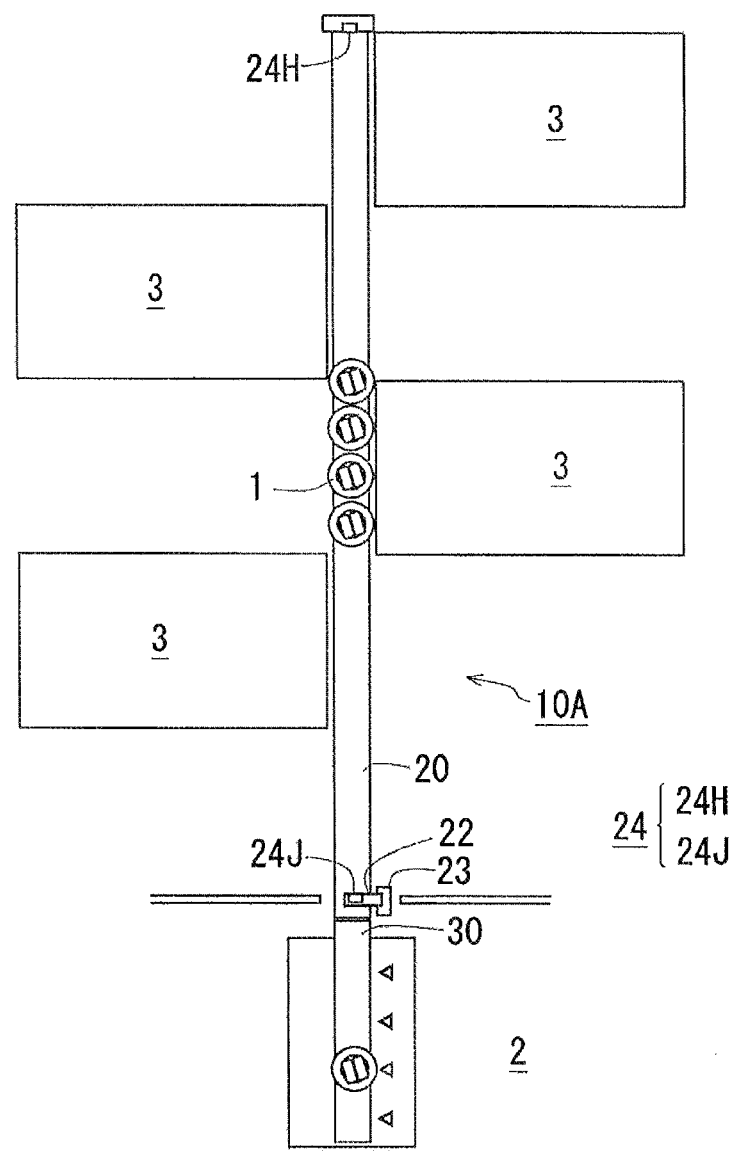
FIG. 12 is a view of a whole configuration of the ordered food and drink conveying apparatus according to a modified example.

FIG. 12 is a view of a whole configuration of the ordered food and drink conveying apparatus according to the modified example. An ordered food and drink conveying apparatus 10A according to the modified example includes a blocking member 22 and an optical sensor 24 in place of the branch lane 40 being omitted. The blocking member 22 is an opening/closing type member, disposed on the main belt conveyor 20 on the side of the kitchen 2, to block the conveying path. The optical sensor 24 is a sensor that detects whether the dish of the food and drink exists on the main belt conveyor 20, and includes a light receiving unit 24J and a light emitting unit 24H. The light receiving unit 24J is fixed to the blocking member 22. The light emitting unit 24H is fixed to the end portion of the main belt conveyor 20 on the side of the customer seat 3.

The optical sensor 24 detects whether the dish 1 of the food and drink exists on the main belt conveyor 20, based on whether the light receiving unit 24J on the side of the kitchen 2 receives light emitted by the light emitting unit 24H toward the kitchen 2 from the portion, on the customer seat 3, of the main belt conveyor 20. When the dish 1 of the food and drink is placed on the main belt conveyor 20, the light emitted by the light emitting unit 24H toward the light receiving unit 24J is blocked by the dish 1 before reaching the light receiving unit 24J.

Figure 13:
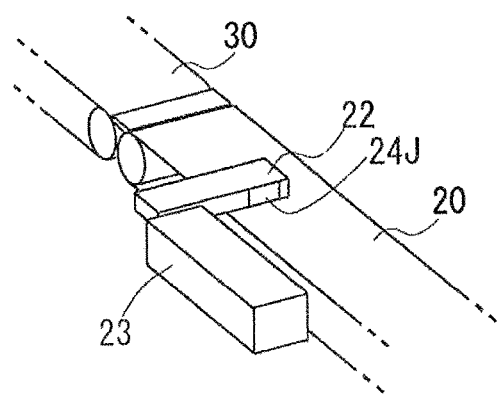
FIG. 13 is an enlarged view of a portion in the vicinity of a light receiving unit of an optical sensor.

FIG. 13 is an enlarged view of a portion in the vicinity of the light receiving unit 24J of the optical sensor 24. The light receiving unit 24J of the optical sensor 24 is fixed to the blocking member 22. The blocking member 22 is secured to a drive shaft provided in an opening/closing device 23. The opening/closing device 23 lifts and lowers the blocking member 22 by moving the drive shaft by using a built-in rotary solenoid within a range of rotational angle of 90 degrees. The blocking member 22 blocks the conveying path when lowered by the opening/closing device 23 to close the route of the dish 1. The blocking member 22 retracts from the conveying path when lifted by the opening/closing device 23 to open the route of the dish 1.

Figure 14:
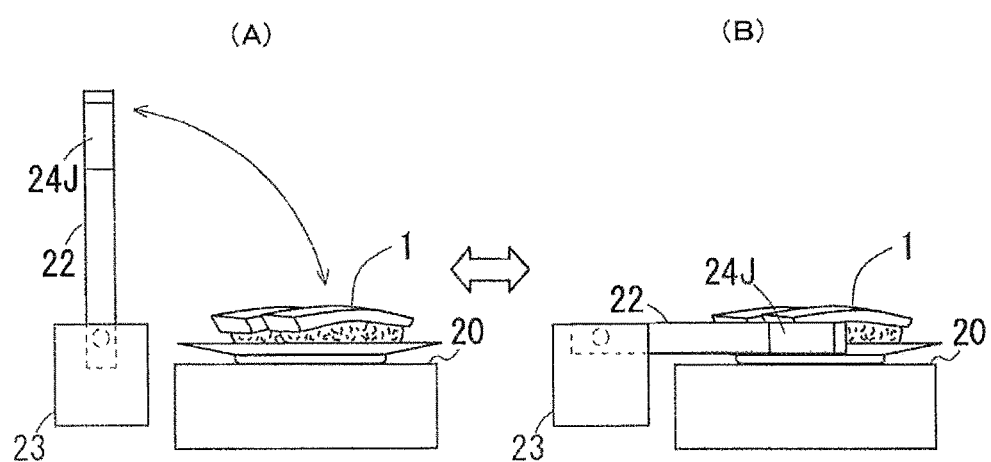
FIG. 14 is a view illustrating an opening/closing state of a blocking member.

FIG. 14 is a view illustrating the opening/closing state of the blocking member 22. When reaching a state of the blocking member 22 being lifted, such a state occurs as to open the route of the dish 1. Consequently, the dish 1 can pass aside of the blocking member 22 without contacting the blocking member 22. However, when reaching the state of the blocking member 22 being lifted, such a state occurs that the light receiving unit 24J is disposed in a position disabling the light receiving unit 24J from receiving the light emitted from the light emitting unit 24H, resulting in a state of being undetectable of whether the dish 1 exists. Whereas when reaching a state of the blocking member 22 being lowered, such a state occurs as to close the route of the dish 1. Consequently, the dish 1 comes to the state of being disabled from passing through the portion installed with the blocking member 22. However, when reaching the state of the blocking member 22 being lowered, such a state occurs that the light receiving unit 24J is disposed to enable the reception of the light emitted from the light emitting unit 24H, resulting in a state of being detectable of whether the dish 1 exists.

The controller for the ordered food and drink conveying apparatus 10A according to the modified example, upon performing the conveyance start operation on the operation panel 33, operates the auxiliary belt conveyor 30, the main belt conveyor 20 and the opening/closing device 23, thereby conveying the dish 1 of the food and drink placed on the auxiliary belt conveyor 30 to the customer seat 3.

Figure 15:
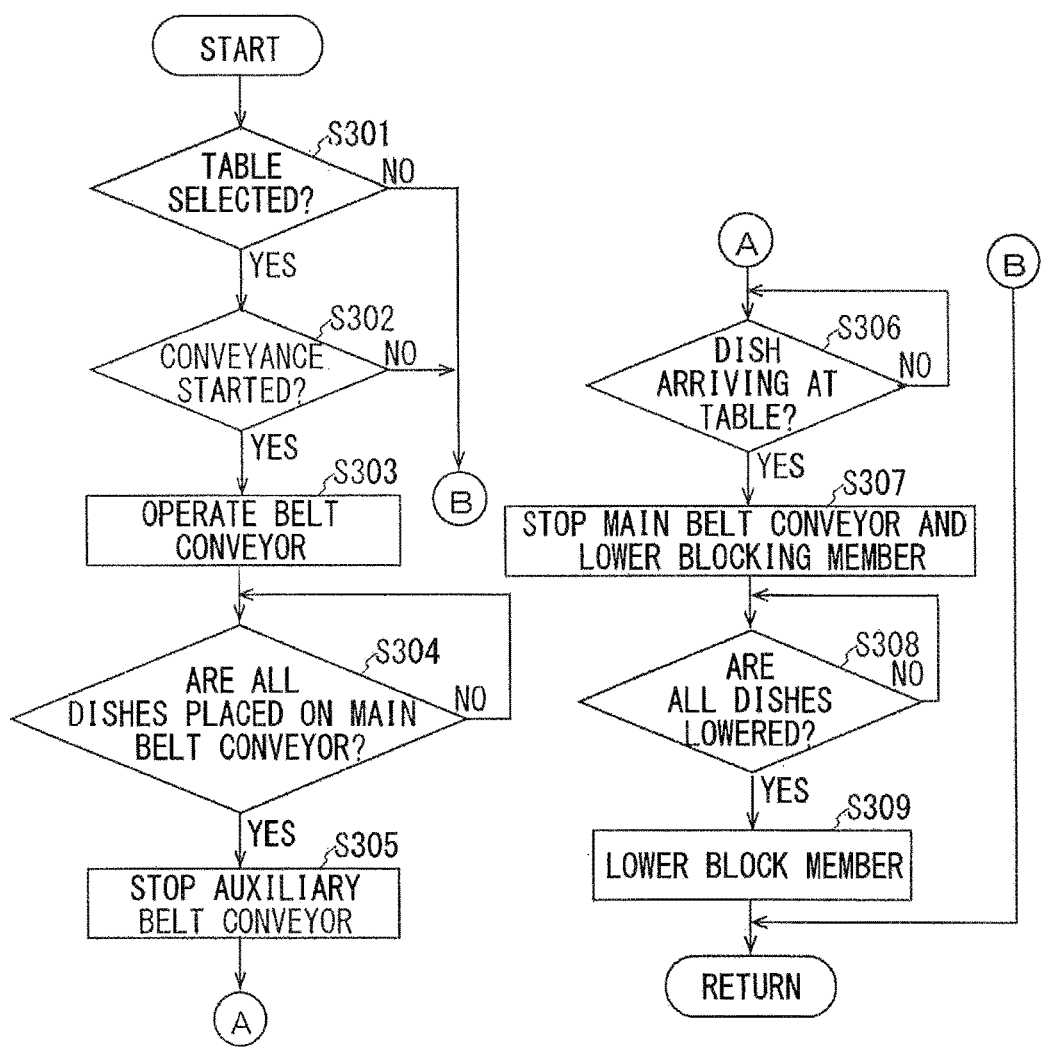
FIG. 15 is a flowchart of a control flow executed upon performing the conveyance start operation in a modified example.

FIG. 15 illustrates a flowchart of a control flow executed upon performing the conveyance start operation in the modified example. The controller for the ordered food and drink conveying apparatus 10A according to the modified example determines whether the table selecting operation is conducted on the operation panel 33 (S301). The controller, when detecting that the table selecting operation is conducted in the process of step S301, determines next whether the conveyance start operation is performed (S302). The controller, when detecting that the conveyance start operation is performed in the process of step S302, operates the main belt conveyor 20 and the auxiliary belt conveyor 30 (S303). At this time, the blocking member 22 is in the state of being lifted.

The controller, after executing the process in step S304, determines whether all the dishes 1 placed on the auxiliary belt conveyor 30 are transferred to the main belt conveyor 20 (S304). The controller may determine, based on the detection result of the sensor installed in the vicinity of the boundary between the auxiliary belt conveyor 30 and the main belt conveyor 20, whether all the dishes 1 placed on the auxiliary belt conveyor 30 are transferred to the main belt conveyor 20, and may also determine based on the period of elapse time since starting the auxiliary belt conveyor 30. The controller, when making an affirmative determination in the process of step S304, stops the auxiliary belt conveyor 30 (S305).

The controller, after executing the process in step S305, determines whether the dish 1 arrives at the selected table (S306). The controller may determine, based on, e.g., the detection result of the sensor installed in the vicinity of the table, whether the dish 1 arrives at the table, and may also determine based on a period of elapse time since starting the conveyance, the elapse time being preset per position of the table. The controller, when making the affirmative determination in the process of step S306, stops the main belt conveyor 20 and concurrently lowers the blocking member 22 (S307).

The controller, after executing the process in step S307, determines based on information of the optical sensor 24 whether all the dishes 1 placed on the main belt conveyor 20 are put off (S308). The controller, when making the affirmative determination in the process of step S308, lifts the blocking member 22 to retract from the conveying path (S309).

Note that the controller, when making a negative determination in step S301 or S302, executes again the processes from step S301 onward but with the processes from step S303 onward being omitted.

Figure 16A:
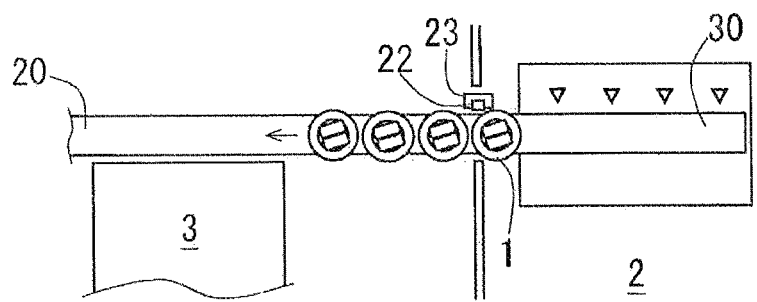
FIGS. 16(A)-16(C) are views each illustrating motions of the dishes and the blocking member when conveyed.
Figure 16B:
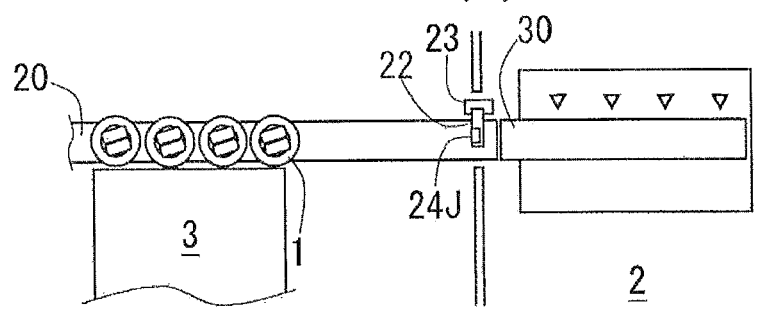
Figure 16C:
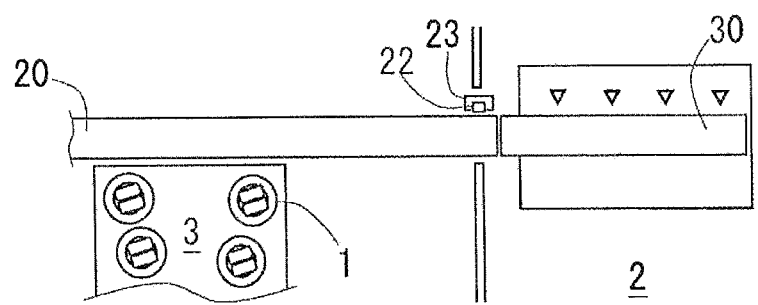

FIG. 16(A)-16(C) are views illustrating motions of the dishes 1 and the blocking member 22 when conveyed. Upon a conveyance start request being made, as illustrated in FIG. 16(A), the main belt conveyor 20 and the auxiliary belt conveyor 30 are operated, and the dishes 1 placed on the auxiliary belt conveyor 30 are sequentially fed onto the main belt conveyor 20. The dishes 1 fed onto the main belt conveyor 20, as illustrated in FIG. 16(B), eventually arrive at the table and stop thereat. The blocking member 22 is lowered concurrently with the stop of the dishes 1. The customers at the table take the dishes 1, and, when all the dishes 1 are cleared from the main belt conveyor 20, the blocking member 22 is lifted as depicted in FIG. 16(C).

The contents of the main operations attained by the controller for the ordered food and drink conveying apparatus 10A according to the modified example are as described above. The ordered food and drink conveying apparatus 10A according to the modified example, similarly to the ordered food and drink conveying apparatus 10 according to the embodiment discussed above, can accept the conveyance start request by placing the next dish 1 on the auxiliary belt conveyor 30 even during the operation of the main belt conveyor 20. Accordingly, even when receiving the large quantity of orders for the food and drink, the ordered food and drink can be efficiently conveyed to the customer seats. Upon the optical sensor 24 detecting that the dish 1 placed on the main belt conveyor 20 is taken out, the conveyance of the next dish 1 placed on the auxiliary belt conveyor 30 can be immediately started. Accordingly, the dishes 1 served with the food and drink can be efficiently conveyed.

Note that the light receiving unit 24J is fixed to the blocking member 22, while the light emitting unit 24H is fixed to the end portion of the main belt conveyor 20 on the side of the customer seats 3 in the modified example, and, however, the light emitting unit 24H may be fixed to the blocking member 22, while the light receiving unit 24J may also be fixed to the end portion of the main belt conveyor 20 on the side of the customer seats 3.

Figure 17A:
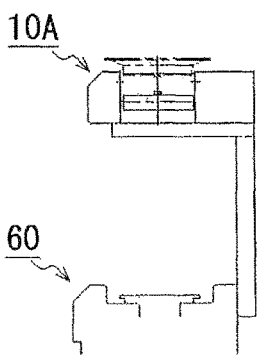
FIGS. 17(A)-17(G) are views illustrating a variation of the conveyance system using the ordered food and drink conveying apparatus according to the modified example.
Figure 17B:
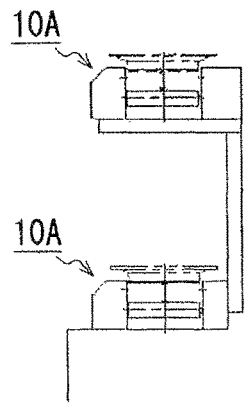
Figure 17C:
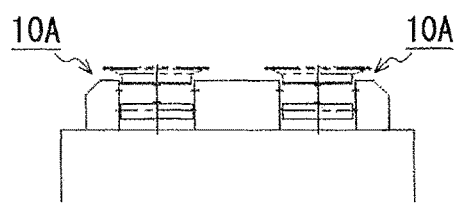
Figure 17D:
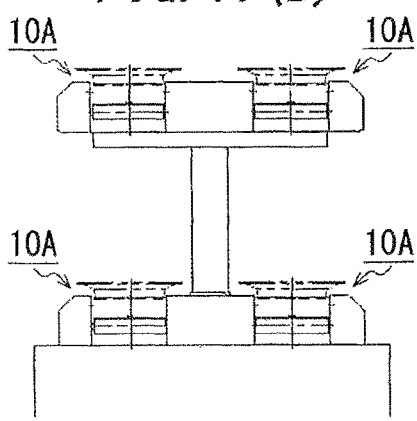
Figure 17E:
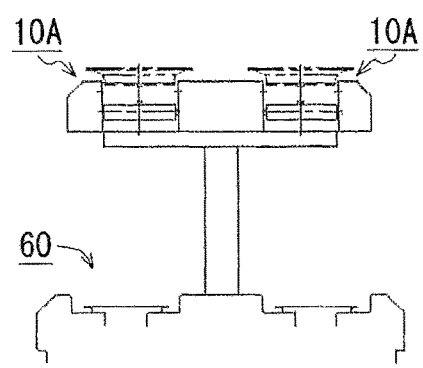
Figure 17F:
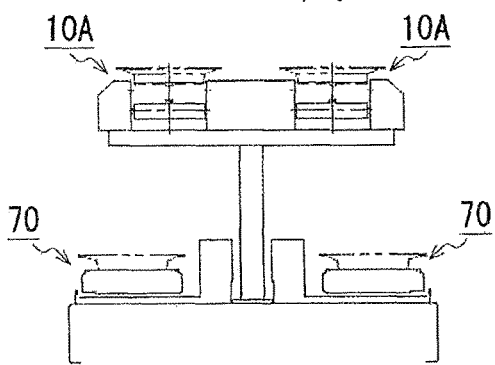
Figure 17G:
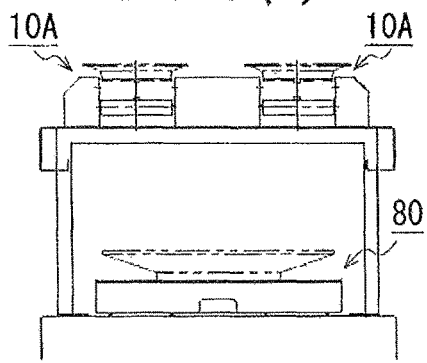

FIGS. 17(A)-17(G) are views illustrating a variation of the conveyance system using the ordered food and drink conveying apparatus 10A according to the modified example, these views being sectional views depicting the variation as taken along the line orthogonal to the conveying direction defined by the conveying path of the main belt conveyor 20. The conveyance system using the ordered food and drink conveying apparatus 10A is installed in the restaurant, in which case, as illustrated in FIG. 17(A), the food and drink circulation conveying apparatus 60 employing the crescent chains may be disposed at the lower stage, while the ordered food and drink conveying apparatus 10A according to the modified example may be disposed at the upper stage. The ordered food and drink conveying apparatuses 10A according to the modified example may also be, as depicted in FIG. 17(B), disposed respectively at the upper and lower stages. The two ordered food and drink conveying apparatuses 10A according to the modified example may further be, as illustrated in FIG. 17(C), disposed right and left in parallel. The ordered food and drink conveying apparatuses 10 disposed in parallel by twos may further be, as illustrated in FIG. 17(D), provided at the upper and lower stages. The two ordered food and drink conveying apparatuses 10A according to the modified example may still further be, as depicted in FIG. 17(E), disposed right and left in parallel at a stage higher than the food and drink circulation conveying apparatus 60 using the crescent chains. The two ordered food and drink conveying apparatuses 10A according to the modified example may yet further be, as illustrated in FIG. 17(F), disposed right and left in parallel at a stage higher than an ordered food and drink conveying apparatus 70 to convey the ordered food and drink placed on a wagon. The two ordered food and drink conveying apparatuses 10A according to the modified example may yet further be, as illustrated in FIG. 17(G), disposed right and left in parallel at a stage higher than an ordered food and drink conveying apparatus 80 to convey various sizes of dishes served with the ordered food and drink placed on the wagon.

DESCRIPTION OF THE REFERENCE NUMERALS AND SYMBOLS

1 . . . dish
2 . . . kitchen
3 . . . customer seat
10, 10A, 70, 80 . . . ordered food and drink conveying apparatus
20 . . . main belt conveyor
21 . . . duct
22 . . . blocking member
23 . . . opening/closing device
24 . . . optical sensor
24H . . . light emitting unit
24J . . . light receiving unit
30 . . . auxiliary belt conveyor
31a, 31b, 31c, 31d . . . sensor
32a, 32b, 32c, 32d . . . position mark
33 . . . operation panel
40 . . . branch lane
41 . . . roller group
42 . . . roller
50 . . . route change device
51 . . . route change member
52 . . . guide unit
60 . . . food and drink circulation conveying apparatus

The invention claimed is:

1. An ordered food and drink conveying apparatus comprising:
   a main belt conveyor to form a conveying path leading to a customer seat from a kitchen side of a restaurant;
   an auxiliary belt conveyor to be provided in extension from the main belt conveyor on the kitchen side to elongate the conveying path;
   a control unit to operate the auxiliary belt conveyor and the main belt conveyor upon a conveyance start operation being performed and to convey a dish of a food and drink placed on the auxiliary belt conveyor to the customer seat,
   the control unit setting the auxiliary belt conveyor in a stop state enabling placement of a dish to be conveyed next on the auxiliary belt conveyor before stopping the main belt conveyor upon a dish being transferred onto the main belt conveyor from the auxiliary belt conveyor by performing the conveyance start operation;
   an opening/closing blocking member to be disposed at the main belt conveyor on the side of the kitchen and to block the conveying path; and
   an optical sensor to detect the existence or non-existence of a dish of a food and drink placed on the main belt conveyor and to include a light receiving unit and a light emitting unit, any one of the light receiving unit and the light emitting unit being fixed to the blocking member, the other unit being fixed to the main belt conveyor on the side of the customer seat,
   the control unit setting the blocking member to open during a period of a dish of a food and drink being transferred onto the main belt conveyor from the auxiliary belt conveyor but setting the blocking member to close during a period of a dish of a food and drink placed on the main belt conveyor arriving at the customer seat.

2. The ordered food and drink conveying apparatus according to claim 1, wherein the control unit sets the blocking member in an open state and operates the auxiliary belt conveyor and the main belt conveyor to convey a dish of a food and drink placed on the auxiliary belt conveyor to the customer seat when the conveyance start operation is performed and when the optical sensor detects non-existence of a dish of a food and drink on the main belt conveyor.

* * * * *